US006939392B2

(12) United States Patent
Huang et al.

(10) Patent No.: US 6,939,392 B2
(45) Date of Patent: Sep. 6, 2005

(54) SYSTEM AND METHOD FOR THERMAL MANAGEMENT

(75) Inventors: He Huang, Glastonbury, CT (US); Scott F. Kaslusky, West Hartford, CT (US); Thomas G. Tillman, West Hartford, CT (US); Timothy D. DeValve, Manchester, CT (US); Luca Bertuccioli, East Longmeadow, MA (US); Michael K. Sahm, Avon, CT (US); Louis J. Spadaccini, Manchester, CT (US); Robert L. Bayt, Hebron, CT (US); Foster Philip Lamm, South Windsor, CT (US); Daniel R. Sabatino, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 12 days.

(21) Appl. No.: 10/657,299

(22) Filed: Sep. 8, 2003

(65) Prior Publication Data

US 2004/0194627 A1 Oct. 7, 2004

Related U.S. Application Data

(63) Continuation-in-part of application No. 10/407,004, filed on Apr. 4, 2003, now Pat. No. 6,709,492.

(51) Int. Cl.[7] .............................................. B01D 19/00

(52) U.S. Cl. ............................... 95/46; 60/39.02; 96/6; 55/385.1

(58) Field of Search ............................ 55/385.1; 95/46, 95/6; 60/39.02, 39.07, 39.83, 266, 730, 736; 123/553; 165/40, 41; 244/117 A

(56) References Cited

U.S. PATENT DOCUMENTS

| | | | | |
|---|---|---|---|---|
| 4,371,385 A | | 2/1983 | Johnson | 96/196 |
| 4,399,035 A | | 8/1983 | Nohmi et al. | 210/500.23 |
| 4,505,124 A | | 3/1985 | Mayer | 62/180 |
| 4,516,984 A | | 5/1985 | Warner et al. | 95/46 |
| 4,542,010 A | | 9/1985 | Roman et al. | 423/579 |
| 4,602,923 A | | 7/1986 | Bernstein | 96/172 |
| 4,636,307 A | | 1/1987 | Inoue et al. | 210/188 |
| 4,705,100 A | | 11/1987 | Black et al. | 165/202 |
| 4,729,773 A | | 3/1988 | Shirato et al. | 96/6 |
| 4,751,104 A | | 6/1988 | Kulprathipanja et al. | 427/565 |
| 4,773,212 A | * | 9/1988 | Griffin et al. | 60/772 |

(Continued)

FOREIGN PATENT DOCUMENTS

| | | |
|---|---|---|
| EP | 0273267 | 7/1988 |
| EP | 0276789 | 8/1988 |
| EP | 0305787 | 3/1989 |
| EP | 0354797 | 2/1990 |
| EP | 0356177 | 2/1990 |

(Continued)

OTHER PUBLICATIONS

Air Force Research Laboratory, Monthly Accomplishment Report (Propulsion Directorate) Mar. 2003, /pps. 1–8.

Air Force Wright Aeronautical Laboratories, Interim Report for Mar. 1987–Jul. 1988, i–vi, pps. 1–22.

Copy of PCT Search Report for Ser. No. PCT/US04/29160 dated Dec. 17, 2004.

*Primary Examiner*—Robert H. Spitzer

(57) ABSTRACT

A system for the management of thermal transfer in a gas turbine engine includes a heat generating sub-system in operable communication with the engine, a fuel source to supply a fuel, a fuel stabilization unit to receive the fuel from the fuel source and to provide the fuel to the engine, and a heat exchanger in thermal communication with the fuel to transfer heat from the heat generating sub-system to the fuel. A method of managing thermal transfer in an aircraft includes removing oxygen from a stream of a fuel fed to an engine used to drive the aircraft, transferring heat from a heat generating sub-system of the aircraft to the fuel, and combusting the fuel. A system for the thermal management of an aircraft provides for powering the aircraft, supplying a fuel deoxygenating the fuel, and transferring heat between a heat generating sub-system of the aircraft and the fuel.

57 Claims, 7 Drawing Sheets

U.S. PATENT DOCUMENTS

| | | | | | |
|---|---|---|---|---|---|
| 4,776,536 | A | | 10/1988 | Hudson et al. | 244/135 R |
| 4,919,856 | A | | 4/1990 | Anazawa et al. | 264/413 |
| 4,955,992 | A | | 9/1990 | Goodale et al. | 96/197 |
| 5,053,060 | A | | 10/1991 | Kopf-Sill et al. | 95/46 |
| 5,078,755 | A | | 1/1992 | Tozawa et al. | 95/46 |
| 5,090,971 | A | | 2/1992 | Barbier | 95/45 |
| 5,123,937 | A | | 6/1992 | Shibata et al. | 95/46 |
| 5,149,018 | A | * | 9/1992 | Clark | 244/117 A |
| 5,154,832 | A | | 10/1992 | Yamamura et al. | 210/640 |
| 5,250,184 | A | | 10/1993 | Maier | 210/653 |
| 5,313,790 | A | | 5/1994 | Barr | 60/267 |
| 5,337,553 | A | | 8/1994 | Barr | 60/39.02 |
| 5,340,384 | A | | 8/1994 | Sims | 96/6 |
| 5,363,641 | A | | 11/1994 | Dixon et al. | 60/778 |
| 5,410,052 | A | | 4/1995 | Smith et al. | 544/224 |
| 5,482,860 | A | | 1/1996 | Copeland et al. | 435/293.1 |
| 5,507,150 | A | | 4/1996 | Weber et al. | 62/100 |
| 5,522,917 | A | | 6/1996 | Honda et al. | 95/46 |
| 5,575,910 | A | | 11/1996 | Karbachsch et al. | 210/321.75 |
| 5,619,956 | A | | 4/1997 | Koziara et al. | 123/41.31 |
| 5,637,544 | A | | 6/1997 | Shadman | 502/4 |
| 5,693,122 | A | | 12/1997 | Berndt | 96/6 |
| 5,695,545 | A | | 12/1997 | Cho et al. | 95/46 |
| 5,725,611 | A | | 3/1998 | Wright et al. | 44/375 |
| 5,725,756 | A | | 3/1998 | Subramaniam et al. | 208/48 B |
| 5,743,110 | A | | 4/1998 | Laude-Bousquet | 62/434 |
| 5,788,742 | A | | 8/1998 | Sugimoto et al. | 95/46 |
| 5,888,275 | A | | 3/1999 | Hamasaki et al. | 96/6 |
| 5,902,382 | A | | 5/1999 | Campain et al. | 96/61 |
| 5,902,747 | A | | 5/1999 | Nemser et al. | 435/325 |
| 6,036,780 | A | | 3/2000 | Helm et al. | 118/713 |
| 6,105,370 | A | | 8/2000 | Weber | 60/733 |
| 6,106,591 | A | | 8/2000 | Keskar et al. | 95/54 |
| 6,168,648 | B1 | | 1/2001 | Ootani et al. | 95/46 |
| 6,176,903 | B1 | | 1/2001 | Wamsiedler | 96/208 |
| 6,182,435 | B1 | | 2/2001 | Niggemann et al. | 60/772 |
| 6,209,794 | B1 | | 4/2001 | Webster et al. | 236/94 |
| 6,228,146 | B1 | | 5/2001 | Kuespert | 95/46 |
| 6,258,154 | B1 | | 7/2001 | Berndt et al. | 96/6 |
| 6,305,156 | B1 | | 10/2001 | Lui | 60/785 |
| 6,309,444 | B1 | | 10/2001 | Sims et al. | 95/46 |
| 6,315,815 | B1 | | 11/2001 | Spadaccini et al. | 95/46 |
| 6,330,825 | B1 | | 12/2001 | Harness et al. | 73/118.1 |
| 6,357,237 | B1 | | 3/2002 | Candy et al. | 60/737 |
| 6,379,796 | B1 | | 4/2002 | Uenishi et al. | 428/398 |
| 6,402,810 | B1 | | 6/2002 | Mayer et al. | 95/46 |
| 6,402,818 | B1 | | 6/2002 | Sengupta | 96/6 |
| 6,415,595 | B1 | | 7/2002 | Wilmot, Jr. et al. | 60/39.07 |
| 6,471,869 | B1 | | 10/2002 | Yanou et al. | 210/651 |
| 6,494,938 | B2 | | 12/2002 | Sims et al. | 96/6 |
| 6,537,514 | B1 | | 3/2003 | Prasad et al. | 423/437.1 |
| 6,582,496 | B1 | | 6/2003 | Cheng et al. | 95/46 |
| 6,709,492 | B1 | * | 3/2004 | Spadaccini et al. | 96/6 |
| 2001/0035093 | A1 | | 11/2001 | Yokota | 96/8 |
| 2002/0020666 | A1 | | 2/2002 | Cote et al. | 210/605 |
| 2002/0045076 | A1 | | 4/2002 | Dieckmann et al. | 429/17 |
| 2002/0195385 | A1 | | 12/2002 | Cho et al. | 210/321.83 |
| 2003/0000131 | A1 | | 1/2003 | Henry et al. | 44/437 |
| 2003/0110947 | A1 | | 6/2003 | Kita et al. | 96/4 |
| 2003/0116015 | A1 | | 6/2003 | Sengupta et al. | 95/46 |
| 2003/0116491 | A1 | | 6/2003 | Yamazaki et al. | 210/188 |
| 2003/0116678 | A1 | | 6/2003 | Gardner | 244/117 A |
| 2003/0129108 | A1 | | 7/2003 | Burch et al. | 422/188 |

FOREIGN PATENT DOCUMENTS

| | | |
|---|---|---|
| EP | 0460512 | 12/1991 |
| EP | 0492801 | 7/1992 |
| EP | 0493869 | 7/1992 |
| EP | 0552090 | 7/1993 |
| EP | 0576677 | 1/1994 |
| EP | 0583748 | 2/1994 |
| EP | 0622475 | 11/1994 |
| EP | 0747112 | 12/1996 |
| EP | 0750322 | 12/1996 |
| EP | 0796649 | 9/1997 |
| EP | 0916835 | 5/1999 |
| EP | 0970738 | 1/2000 |
| EP | 1018353 | 7/2000 |
| EP | 1052011 | 11/2000 |
| EP | 1095691 | 5/2001 |
| EP | 1166859 | 1/2002 |
| EP | 1210971 | 6/2002 |
| EP | 0963229 | 9/2002 |
| EP | 1239189 | 9/2002 |
| EP | 1270063 | 1/2003 |
| EP | 1277504 | 1/2003 |
| EP | 1329617 | 7/2003 |
| JP | 63151307 | 6/1988 |
| JP | 3038231 | 2/1991 |
| JP | 3154686 | 7/1991 |
| JP | 3169304 | 7/1991 |
| JP | 3193106 | 8/1991 |
| JP | 4036178 | 2/1992 |
| JP | 4118004 | 4/1992 |
| JP | 4250830 | 9/1992 |
| JP | 5084474 | 4/1993 |
| JP | 5317605 | 12/1993 |
| JP | 6121902 | 5/1994 |
| JP | 6121920 | 5/1994 |
| JP | 7080205 | 3/1995 |
| JP | 7227504 | 8/1995 |
| JP | 8000906 | 1/1996 |
| JP | 8290044 | 11/1996 |
| JP | 8332306 | 12/1996 |
| JP | 10028805 | 2/1998 |
| JP | 10165936 | 6/1998 |
| JP | 10174803 | 6/1998 |
| JP | 11009902 | 1/1999 |
| JP | 11033373 | 2/1999 |
| JP | 11114308 | 4/1999 |
| JP | 11114309 | 4/1999 |
| JP | 11244607 | 9/1999 |
| JP | 11342304 | 12/1999 |
| JP | 2000051606 | 2/2000 |
| JP | 2000084368 | 3/2000 |
| JP | 2000117068 | 4/2000 |
| JP | 2000140505 | 5/2000 |
| JP | 2000262871 | 9/2000 |
| JP | 10216404 | 10/2000 |
| JP | 2000288366 | 10/2000 |
| JP | 2000350902 | 12/2000 |
| JP | 2000354857 | 12/2000 |
| JP | 2001286702 | 10/2001 |
| JP | 2002370006 | 12/2002 |
| JP | 2003010604 | 1/2003 |
| JP | 2003062403 | 3/2003 |
| JP | 2003094687 | 4/2003 |
| WO | WO9416800 | 8/1994 |
| WO | WO9702190 | 1/1997 |
| WO | WO9939811 | 2/1998 |
| WO | WO9844255 | 10/1998 |
| WO | WO9728891 | 6/2000 |
| WO | WO9601683 | 7/2000 |
| WO | WO0044479 | 8/2000 |
| WO | WO0044482 | 8/2000 |
| WO | WO02062446 | 8/2002 |
| WO | WO02077130 | 10/2002 |
| WO | WO03029744 | 4/2003 |
| WO | WO03036747 | 5/2003 |

* cited by examiner

SYSTEM AND METHOD FOR THERMAL MANAGEMENT

CROSS REFERENCE TO RELATED APPLICATION

This application is a continuation-in-part application of U.S. patent application Ser. No. 10/407,004 entitled "Planar Membrane Deoxygenator" filed on Apr. 4, 2003, now U.S. Pat. No. 6,709,492, issued Mar. 23, 2004, the content of which is incorporated herein in its entirety.

TECHNICAL FIELD

This invention relates generally to systems, methods, and devices for the management of heat transfer and, more particularly, to systems, methods, and devices for managing the transfer of heat between an energy conversion device and its adjacent environment.

BACKGROUND

Heat management systems for energy conversion devices oftentimes utilize fuels as cooling mediums, particularly on aircraft and other airborne systems where the use of ambient air as a heat sink results in significant performance penalties. In addition, the recovery of waste heat and its re-direction to the fuel stream to heat the fuel results in increased operating efficiency. One of the factors negatively affecting the usable cooling capacity of a particular fuel with regard to such a system is the rate of formation of undesirable oxidative reaction products and their deposit onto the surfaces of fuel system devices. The rate of formation of such products may be dependent at least in part on the amount of dissolved oxygen present within the fuel. The amount of dissolved oxygen present may be due to a variety of factors such as exposure of the fuel to air and more specifically the exposure of the fuel to air during fuel pumping operations. The presence of dissolved oxygen can result in the formation of hydroperoxides that, when heated, form free radicals that polymerize and form high molecular weight oxidative reaction products, which are typically insoluble in the fuel. Such products may be subsequently deposited within the fuel delivery and injection systems, as well as on the other surfaces, of the energy conversion device detrimentally affecting the performance and operation of the energy conversion device. Because the fuels used in energy conversion devices are typically hydrocarbon-based, the deposit comprises carbon and is generally referred to as "coke."

Increasing the temperature of the fuel fed to the energy conversion device increases the rate of the oxidative reaction that occurs. Currently available fuels that have improved resistance to the formation of coke are generally more expensive or require additives. Fuel additives require additional hardware, on-board delivery systems, and costly supply infrastructure. Furthermore, such currently available fuels having improved resistance to the formation of coke are not always readily available.

SUMMARY OF THE INVENTION

The present invention is directed in one aspect to a system for the management of thermal transfer in a gas turbine engine. Such a system includes a heat generating sub-system (or multiple sub-systems) disposed in operable communication with the engine, a fuel source configured to supply a fuel, a fuel stabilization unit configured to receive the fuel from the fuel source and to provide the fuel to the engine, and a heat exchanger disposed in thermal communication with the fuel to effect the transfer of heat from the heat generating sub-system to the fuel.

In another aspect, a system for the management of heat transfer includes an energy conversion device and a fuel system configured to supply a fuel to the energy conversion device. The fuel system includes at least one heat generating sub-system disposed in thermal communication with the fuel from the fuel system to effect the transfer of heat from the heat generating sub-system to the fuel. The fuel is substantially coke-free and is heated to a temperature of greater than about 550 degrees F.

In another aspect, a method of managing thermal transfer in an aircraft includes removing oxygen from a stream of a fuel fed to an engine used to drive the aircraft, transferring heat from a heat generating sub-system of the aircraft to the fuel, and combusting the fuel.

In yet another aspect, a system for the thermal management of an aircraft includes means for powering the aircraft, means for supplying a fuel to the means for powering the aircraft, means for deoxygenating the fuel, and means for effecting the transfer of heat between a heat generating sub-system of the aircraft and the fuel.

In still another aspect, a system for the management of thermal transfer in an aircraft includes an aircraft engine, a heat generating sub-system (or multiple sub-systems) disposed in operable communication with the aircraft engine, a fuel source configured to supply a fuel, a fuel stabilization unit configured to receive the fuel from the fuel source and to provide an effluent fuel stream to the aircraft engine, and a heat exchanger disposed in thermal communication with the effluent fuel stream from the fuel stabilization unit and the heat generating sub-system to effect the transfer of heat from the heat generating sub-system to the effluent fuel stream.

One advantage of the above systems and method is an increase in the exploitable cooling capacity of the fuel. By increasing the exploitable cooling capacity, energy conversion devices are able to operate at increased temperatures while utilizing fuels of lower grades. Operation of the devices at increased temperatures provides a greater opportunity for the recovery of waste heat from heat generating components of the system. The recovery of waste heat, in turn, reduces fuel consumption costs associated with operation of the device because combustion of pre-heated fuel requires less energy input than combustion of unheated fuel. Increased cooling capacity (and thus high operating temperatures, recovery of waste heat, and reduced fuel consumption) also increases the overall efficiency of operating the device.

Another advantage is a reduction in coke formation within the energy conversion device. Decreasing the amount of dissolved oxygen present within the fuel as the temperature is increased retards the rate of oxidative reaction, which in turn reduces the formation of coke and its deposition on the surfaces of the energy conversion device, thereby reducing the maintenance requirements. Complete or partial deoxygenation of the fuel suppresses the coke formation across various aircraft fuel grades. A reduction in the amount of oxygen dissolved within the fuel decreases the rate of coke deposition and correspondingly increases the maximum allowable temperature sustainable by the fuel during operation of the energy conversion device. In other words, when lower amounts of dissolved oxygen are present within a fuel, more thermal energy can be absorbed by the fuel, thereby resulting in operations of the energy conversion device at higher fuel temperatures before coke deposition in the energy conversion device becomes undesirable.

Operational advantages to pre-heating the fuel to temperatures that prevent, limit, or minimize coke formation prior to entry of the fuel into the FSU also exist. In particular, oxygen solubility in the fuel, diffusivity of oxygen in the fuel, and diffusivity of oxygen through the membrane increase with increasing temperature. Thus, FSU performance may be increased by pre-heating the fuel. This may result in either a reduction in FSU volume (size and weight reductions) or increased FSU performance, which may result in further reductions in the fuel oxygen levels exiting the FSU. Furthermore, the reduction in FSU volume may further allow system design freedom in placement of the FSU within the fuel system (either upstream- or downstream of low-grade heat loads) and in the ability to cascade the heat loads and fuel system heat transfer hardware.

DETAILED DESCRIPTION

Figure 1:
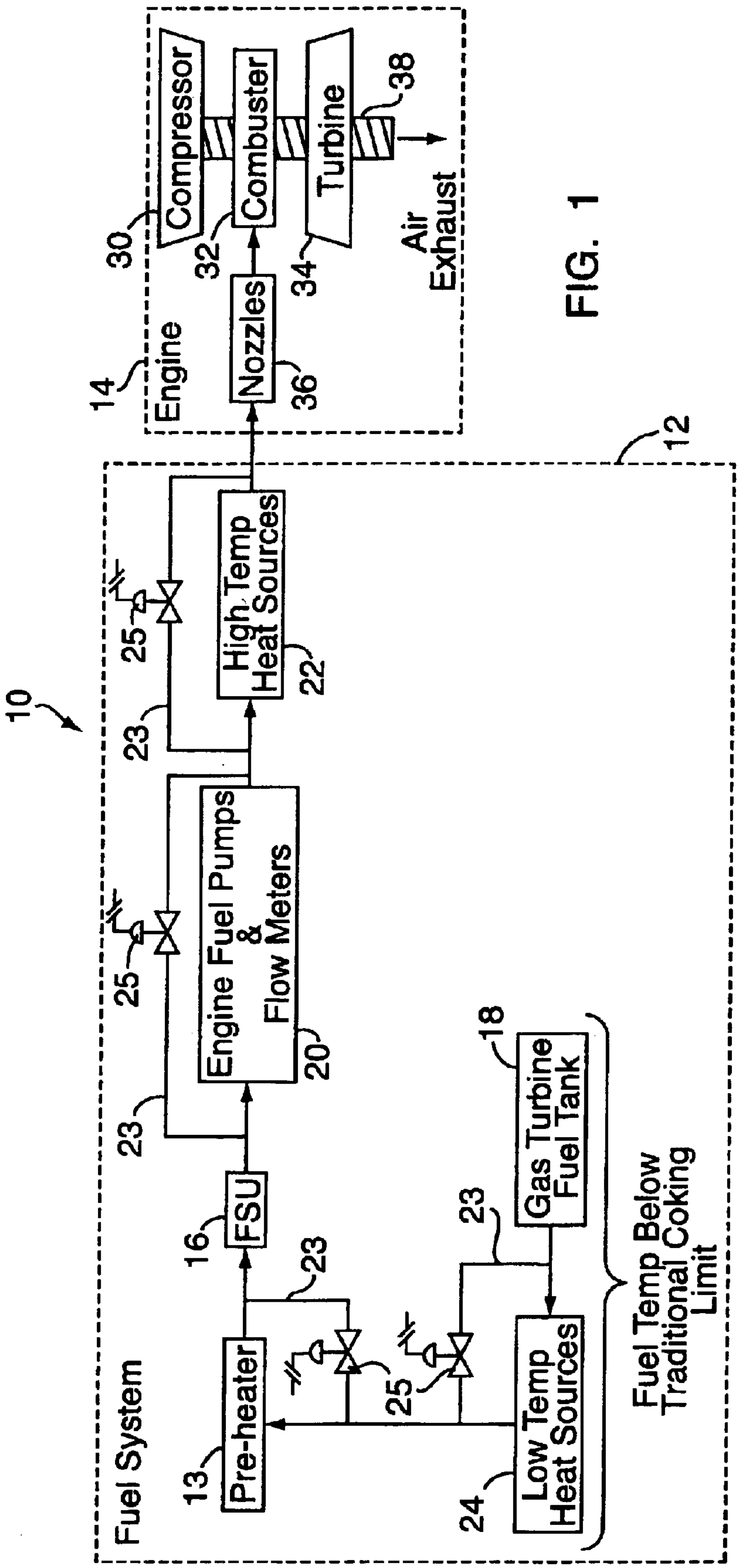
FIG. 1 is a schematic representation of a system for the management of heat transfer between an energy conversion device and a fuel system.

Referring to FIG. 1, a system for the management of heat transfer is shown generally at 10 and is hereinafter referred to as "system 10." As used herein, the term "management of heat transfer" is intended to indicate the control of heat transfer by regulation of various chemical- and physical parameters of associated sub-systems and work cycles. The sub-systems include, but are not limited to, fuel systems that provide a hydrocarbon-based fuel to the work cycle. The work cycle may be an energy conversion device. Although the system 10 is hereinafter described as being a component of an aircraft, it should be understood that the system 10 has relevance to other applications, e.g., utility power generation, land-based transport systems, marine- and freshwater based transport systems, industrial equipment systems, and the like. Furthermore, it should be understood that the term "aircraft" includes all types of winged aircraft, rotorcraft, winged- and rotor hybrids, spacecraft, drones and other unmanned craft, weapons delivery systems, and the like.

In one embodiment of the system 10, a fuel system 12 includes a fuel stabilization unit (FSU) 16 that receives fuel from a fuel source 18 and provides the fuel to the energy conversion device (hereinafter "engine 14"). Various heat generating sub-systems (e.g., low temperature heat sources 24, pumps and metering systems 20, high temperature heat sources 22, combinations of the foregoing sources and systems, and the like), which effect the thermal communication between various components of the system 10 during operation, are integrated into the fuel system 12 by being disposed in thermal communication with the fuel either upstream or downstream from the FSU 16. A fuel pre-heater 13 may further be disposed in the fuel system 12 prior to the FSU 16 to increase the temperature of the fuel received into the FSU 16. Selectively-actuatable fuel line bypasses 23 having valves 25 are preferably disposed in the fuel system 12 to provide for the bypass of fuel around the various sub-systems and particularly the high temperature heat sources 22.

The engine 14 is disposed in operable communication with the various heat generating sub-systems and preferably comprises a gas turbine engine having a compressor 30, a combustor 32, and a turbine 34. Fuel from the fuel system 12 is injected into the combustor 32 through fuel injection nozzles 36 and ignited. An output shaft 38 of the engine 14 provides output power that drives a plurality of blades that propel the aircraft.

Operation of the system 10 with the FSU 16 allows for the control of heat generated by the various sources and systems to provide benefits and advantages as described above. The temperature at which coke begins to form in the fuel is about 260 degrees F. Operation of the engine 14 (e.g., a gas turbine engine) at fuel temperatures of up to about 325 degrees F. generally produces an amount of coke buildup that is acceptable for most military applications. Operation of the system 10 with the FSU 16 to obtain a reduction in oxygen content of the fuel, however, enables the engine 14 to be operated at fuel temperatures greater than about 325 degrees F., preferably greater than about 550 degrees F., and more preferably about 700 degrees F. to about 800 degrees F. with no significant coking effects. The upper limit of operation is about 900 degrees F., which is approximately the temperature at which the fuel pyrolizes.

Referring now to FIGS. 2–7, the FSU 16 is shown. The FSU 16 is a fuel deoxygenating device that receives fuel either directly or indirectly from the fuel source. Upon operation of the FSU 16, the amount of dissolved oxygen in the fuel is reduced to provide deoxygenated fuel. As used herein, the term "deoxygenated fuel" is intended to indicate fuel having reduced oxygen content relative to that of fuel in equilibrium with ambient air. The oxygen content of fuel in equilibrium with ambient air is about 70 parts per million (ppm). Depending upon the specific application of the FSU 16 (e.g., the operating temperatures of the system 10 of FIG. 1), the oxygen content of deoxygenated fuel may be about 5 ppm or, for applications in which operating temperatures approach about 900 degrees F., less than about 5 ppm. A reduction in the amount of dissolved oxygen in the fuel enables the fuel to absorb an increased amount of thermal energy while reducing the propagation of free radicals that form insoluble reaction products, thereby allowing the fuel to be substantially coke-free. As used herein, the term "substantially coke-free" is intended to indicate a fuel that, when used to operate an engine at elevated temperatures, deposits coke at a rate that enables the maintenance and/or overhaul schedules of the various apparatuses into which the FSU 16 is incorporated to be extended.

The FSU 16 includes an assembly of flow plates 27, permeable composite membranes 42, and porous substrates 39. The flow plates 27, the permeable composite membranes 42, and the porous substrates 39 are preferably arranged in a stack such that the permeable composite membranes 42 are disposed in interfacial engagement with the flow plates 27 and such that the porous substrates 39 are disposed in interfacial engagement with the permeable composite membranes 42. The flow plates 27 are structured to define passages 50 through which the fuel flows.

The assembly of flow plates 27 is mounted within a vacuum housing 60. Vacuum is applied to the vacuum housing 60 to create an oxygen partial pressure differential across the permeable composite membranes 42, thereby causing the migration of dissolved oxygen from the fuel flowing through the assembly of flow plates 27 and to an oxygen outlet 35. The source of the partial pressure differential vacuum may be a vacuum pump, an oxygen-free circulating gas, or the like. In the case of an oxygen-free circulating gas, a strip gas (e.g., nitrogen) is circulated through the FSU 16 to create the oxygen pressure differential to aspirate the oxygen from the fuel, and a sorbent or filter or the like is disposed within the circuit to remove the oxygen from the strip gas.

Figure 2:
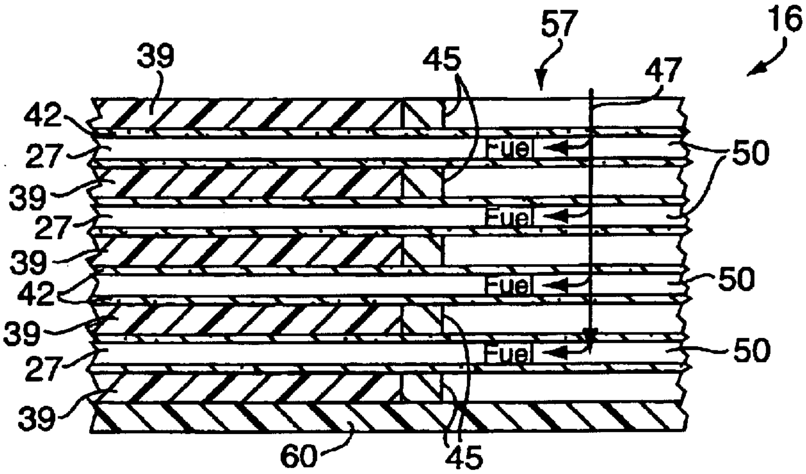
FIG. 2 is a schematic representation of a fuel stabilization unit showing a fuel inlet.

Referring specifically to FIG. 2, an inlet 57 of the FSU 16 is shown. Fuel entering the FSU 16 flows from the inlet 57 in the direction indicated by an arrow 47 and is dispersed into each of the passages 50. Seals 45 between the stacked flow plates 27 prevent the fuel from contacting and flowing into the porous substrates 39.

Figure 3:
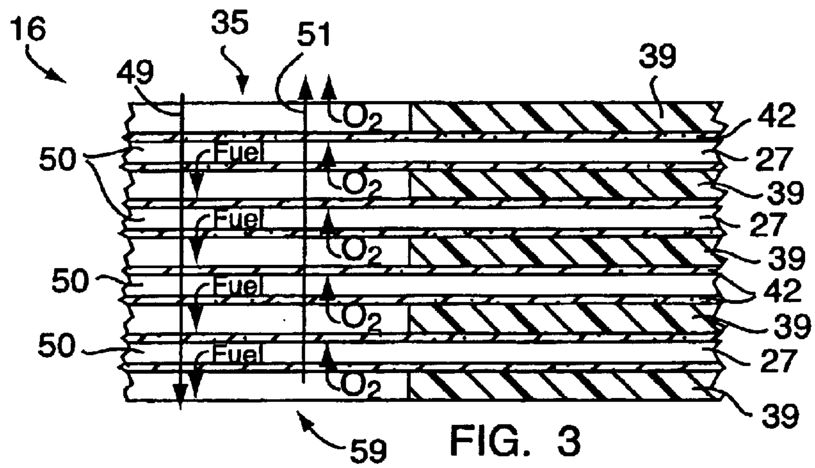
FIG. 3 is a schematic representation of the fuel stabilization unit showing a fuel outlet and an oxygen outlet.

Referring specifically to FIG. 3, outlets of the FSU 16 are shown. Oxygen removed through the porous substrates 39 is removed through an oxygen outlet 35 via the vacuum source, as is indicated by an arrow 51. Deoxygenated fuel flowing through the flow plates 27 is removed through a fuel outlet 59, as is indicated by an arrow 49, and directed to one or several downstream sub-systems (e.g., pumps and metering systems, high temperature heat sources, and the like) and to the engine.

Figure 4:
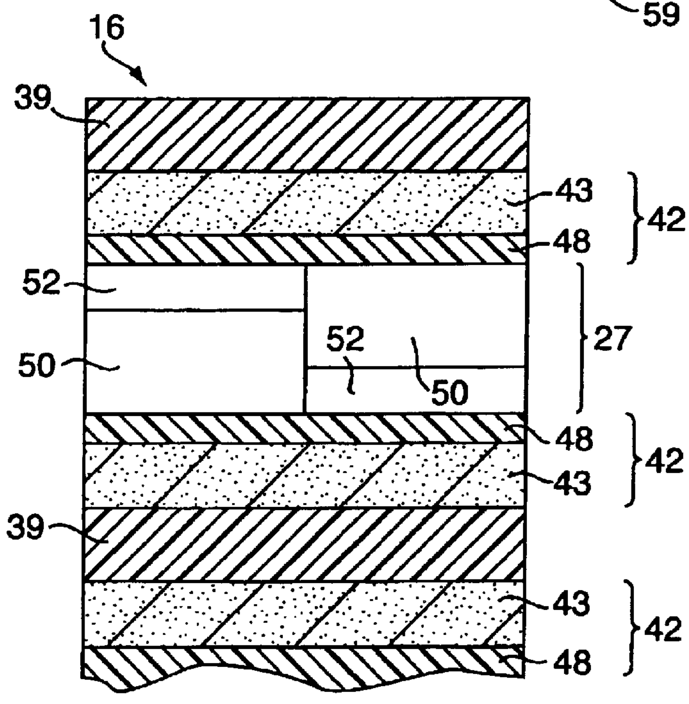
FIG. 4 is a cross sectional view of an assembly of a flow plate, permeable composite membranes, and porous substrates that comprise the fuel stabilization unit.

Referring now to FIG. 4, the assembly of flow plates 27, permeable composite membranes 42, and porous substrates 39 is shown. As stated above, the FSU 16 comprises an assembly of interfacially-engaged flow plates 27, permeable composite membranes 42, and porous substrates 39. The flow plates 27, described below with reference to FIG. 5, comprise planar structures that define the passages 50 through which the fuel is made to flow. The permeable composite membranes 42 preferably comprise fluoropolymer coatings 48 supported by porous backings 43, which are in turn supported against the flow plates 27 by the porous substrates 39. The application of vacuum to the assembly creates the partial pressure gradient that draws dissolved oxygen from the fuel in passages 50 through the permeable composite membranes 42 (in particular, through the fluoropolymer coatings 48, through the porous backings 43, and through the porous substrates 39) and out to the oxygen outlet 35.

The permeable composite membrane 42 is defined by an amorphous fluoropolymer coating 48 supported on the porous backing 43. The fluoropolymer coating 48 preferably derives from a polytetrafluoroethylene (PTFE) family of coatings and is deposited on the porous backing 43 to a thickness of about 0.5 micrometers to about 20 micrometers, preferably about 2 micrometers to about 10 micrometers, and more preferably about 2 micrometers to about 5 micrometers. The porous backing 43 preferably comprises a polyvinylidene difluoride (PVDF) or polyetherimide (PEI) substrate having a thickness of about 0.001 inches to about 0.02 inches, preferably about 0.002 inches to about 0.01 inches, and more preferably about 0.005 inches. The porosity of the porous backing 43 is greater than about 40% open space and preferably greater than about 50% open space. The nominal pore size of the pores of the porous backing 43 is less than about 0.25 micrometers, preferably less than about 0.2 micrometers, and more preferably less than about 0.1 micrometers. Amorphous polytetrafluoroethylene is available under the trade name Teflon AF® from DuPont located in Wilmington, Del. Other fluoropolymers usable as the fluoropolymer coating 48 include, but are not limited to, perfluorinated glassy polymers and polyperfluorobutenyl vinyl ether. Polyvinylidene difluoride is available under the trade name Kynar® from Atofina Chemicals, Inc. located in Philadelphia, Pa.

The porous substrate 39 comprises a lightweight plastic material (e.g., PVDF PEI polyethylene or the like) that is compatible with hydrocarbon-based fuel. Such material is of a selected porosity that enables the applied vacuum to create a suitable oxygen partial pressure differential across the permeable composite membrane 42. The pore size, porosity, and thickness of the porous substrate 39 are determined by the oxygen mass flux requirement, which is a function of the mass flow rate of fuel. In a porous substrate 39 fabricated from polyethylene, the substrate is about 0.03 inches to about 0.09 inches in thickness, preferably about 0.04 inches to about 0.085 inches in thickness, and more preferably about 0.070 inches to about 0.080 inches in thickness. Alternatively, the porous substrate may comprise a woven plastic mesh or screen. a thinner and lighter vacuum permeate having a thickness of about 0.01 inches to about 0.03 inches.

Figure 5:
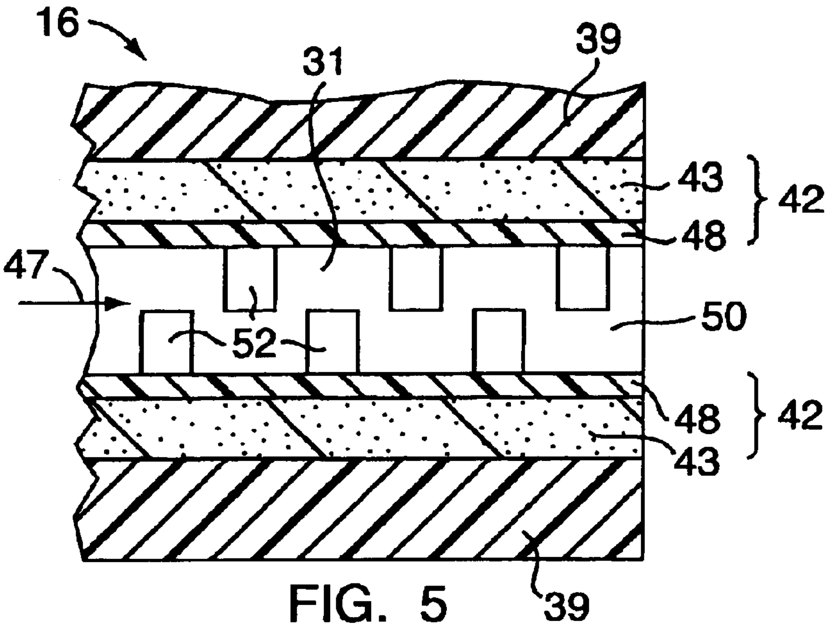
FIG. 5 is a schematic representation of a fuel passage defined by the flow plate.
Figure 6:
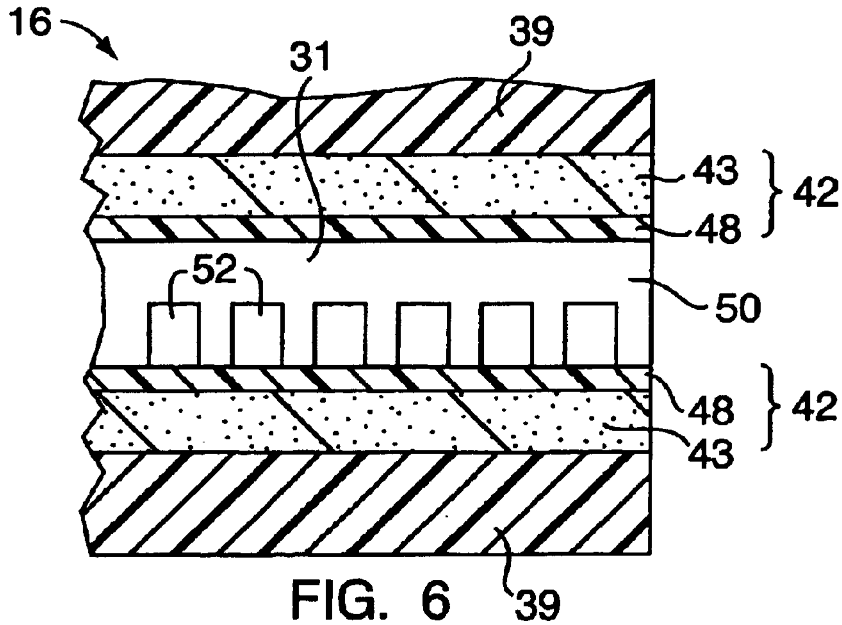
FIG. 6 is an alternate embodiment of a fuel passage defined by the flow plate.

Referring now to FIGS. 5 and 6, the flow plates 27 comprise planar structures having channels, one of which is shown at 31, and ribs or baffles 52 arranged in the channels 31 to form a structure that, when assembled with the permeable composite membranes 42, define the passages 50. The baffles 52 are disposed across the channels 31. The passages 50 are in fluid communication with the inlet 57 and the outlet 59. The vacuum is in communication with the porous substrates 39 through the oxygen outlet 35 (FIG. 3).

The baffles 52 disposed within the passages 50 promote mixing of the fuel such that significant portions of the fuel contact the fluoropolymer coating 48 during passage through the FSU 16 to allow for diffusion of dissolved oxygen from the fuel. Because increased pressure differentials across the passages are generally less advantageous than lower pressure differentials, the baffles 52 are preferably configured to provide laminar flow and, consequently, lower levels of mixing (as opposed to turbulent flow) through the passages 50. Turbulent flow may, on the other hand, be preferred in spite of its attendant pressure drop when it provides the desired level of mixing and an acceptable pressure loss. Turbulent channel flow, although possessing a higher pressure drop than laminar flow, may promote sufficient mixing and enhanced oxygen transport such that the baffles may be reduced in size or number or eliminated altogether. The baffles 52 extend at least partially across the passages 50 relative to the direction of fuel flow to cause the fuel to mix and to contact the fluoropolymer coating 48 in a uniform manner while flowing through the flow plates 27.

Referring to FIG. 5, in operation, fuel flowing through the passages 50 of the flow plate in the direction of the arrow 47 is caused to mix by the baffles 52 and contact the fluoropolymer coating 48. As shown, the baffles 52 are alternately disposed at the upper and lower faces of the flow plate. In this embodiment, the baffles 52 induce vertical (upwards and downwards) velocity components that enhance mass transport and effectively increase the oxygen diffusivity in the fuel. This increases the oxygen/fluoropolymer contact, and thus the amount of oxygen removed from the FSU. Fuel flowing over the baffles 52 is encouraged to mix such that the fuel more uniformly contacts the fluoropolymer coating 48 to provide for a more uniform diffusion through the porous backing 43 and into the porous substrate 39 and out of the FSU. Referring to FIG. 6, another embodiment of the flow plate is shown including baffles 52 arranged at one side of the flow plate. It should be understood that it is within the contemplation of this invention to include any configuration of baffles 52 or mixing enhancers, including, but not limited to, inertial devices, mechanical devices, acoustic devices, or the like, to induce either a turbulent flow regime or a laminar flow regime to attain the desired amount of mixing and/or mass transport according to application-specific parameters.

Figure 7:
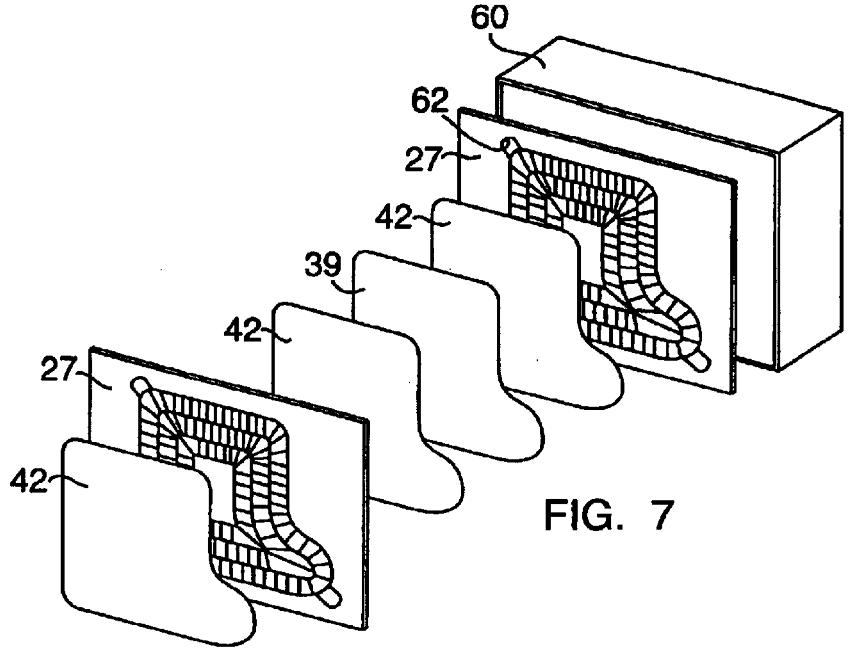
FIG. 7 is an exploded view of a flow plate/membrane/substrate assembly.

Referring to FIG. 7, one exemplary embodiment of a stack of flow plates 27 is shown. The flow plates 27 are preferably rectangularly-shaped to facilitate the scaling of the FSU for various applications by the adjustment of the number of flow plates 27. Alternately, the flow plates 27 may also be circular in structure, thereby providing increased structural integrity to the stacked arrangement. Regardless of the shape of the flow plates 27, the stack is supported within the vacuum frame 60 that includes an inlet 62 that defines the vacuum opening to provide vacuum communication with the porous substrates 39.

Referring now to FIGS. 2–7, the specific quantity of flow plates 27, permeable composite membranes 42, and porous substrates 39 for use with the FSU 16 are determined by the application-specific requirements of the system 10, such as fuel type, fuel temperature, and mass flow demand from the engine. Further, different fuels containing differing amounts of dissolved oxygen may require differing amounts of filtering to remove a desired amount of dissolved oxygen to provide for optimization of the operation of the system 10 and for optimum thermal management of the system 10.

Performance of the FSU 16 is related to permeability of the permeable composite membrane 42 and the rate of diffusion of oxygen therethrough. The permeability of the permeable composite membrane 42 is a function of the solubility of oxygen in the fluoropolymer coating 48 and the transfer of the oxygen through the porous backing 43. The permeable composite membrane 42 (the combination of the fluoropolymer coating 48 and the porous backing 43) is of a selected thickness to allow for the desired diffusion of dissolved oxygen from the fuel to the porous substrate 39 for specific applications of vacuum or strip gas (e.g., nitrogen).

The rate of diffusion of oxygen from the fuel through the surface of the permeable composite membrane 42 is affected by the duration of contact of fuel with the permeable composite membrane 42 and the partial pressure differential across the permeable composite membrane 42. It is desirable to maintain a steady application of vacuum on the FSU 16 and constant contact between the permeable composite membrane 42 and fuel in order to maximize the amount of oxygen removed from the fuel. Optimizing the diffusion of dissolved oxygen involves balancing the fuel flow, fuel temperature, vacuum level, and the amount of mixing/transport, as well as accounting for minimizing pressure loss and accounting for manufacturing tolerances and operating costs.

Referring back to FIG. 1, the fuel source 18 may comprise a plurality of vessels from which the fuel can be selectively drawn. In winged aircraft, such vessels may be irregularly-shaped so as to be accommodated in the wings of the aircraft. Each vessel is disposed in fluid communication with a pump, which may be manually or automatically controlled to selectively draw fuel from either or both of the vessels and to pump the fuel to the FSU 16.

Still referring back to FIG. 1, one aspect of the thermal management of the system 10 may be embodied in the transfer of heat between fuel stored in the fuel source 18 and at least one of the low temperature heat sources 24. In particular, because the low temperature heat sources 24 are below the coking limit of the fuel, the fuel flowing from the fuel source 18 may function as a low-grade heat sink to absorb heat from some or all of the low temperature heat sources 24. Such low temperature heat sources 24 include, but are not limited to, hydraulic heat loads, generator heat loads, engine accessory gear box heat loads, fuel pump heat loads, fan drive gear system heat loads, and engine oil system loads. The fuel flowing from the fuel source 18 may be circulated to any one or a combination of such loads for the exchange of heat therewith. The amount of heat absorbable by the fuel is such that the temperature of the fuel therein is maintained at less than the temperature limit at which fuel can be received into the FSU 16.

Figure 8:
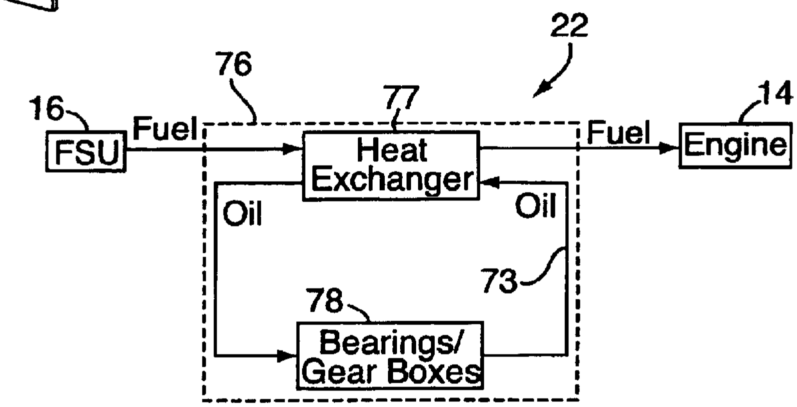
FIG. 8 is a system for the management of heat transfer in which a high temperature heat source is a high temperature oil system.

Referring now to FIGS. 1 and 8–13, the management of heat transfer between the fuel and the various high temperature heat sources 22 is shown. In FIG. 8, the high temperature heat source 22 may comprise a high temperature oil system 76. The high temperature oil system 76 includes a heat exchanger 77 configured to transfer heat from an oil stream 73 received from at least one bearing and/or gearing arrangement 78 to the deoxygenated fuel from the FSU 16. Accordingly, the temperature of the bearing and/or gearing arrangement 78 is reduced considerably, and the temperature of the fuel stream from the heat exchanger 77 is increased to a temperature near that of the maximum oil temperature and greater than the coking limit of about 325 degrees F. but less than the temperature at which pyrolysis occurs (about 900 degrees F.).

Figure 9:
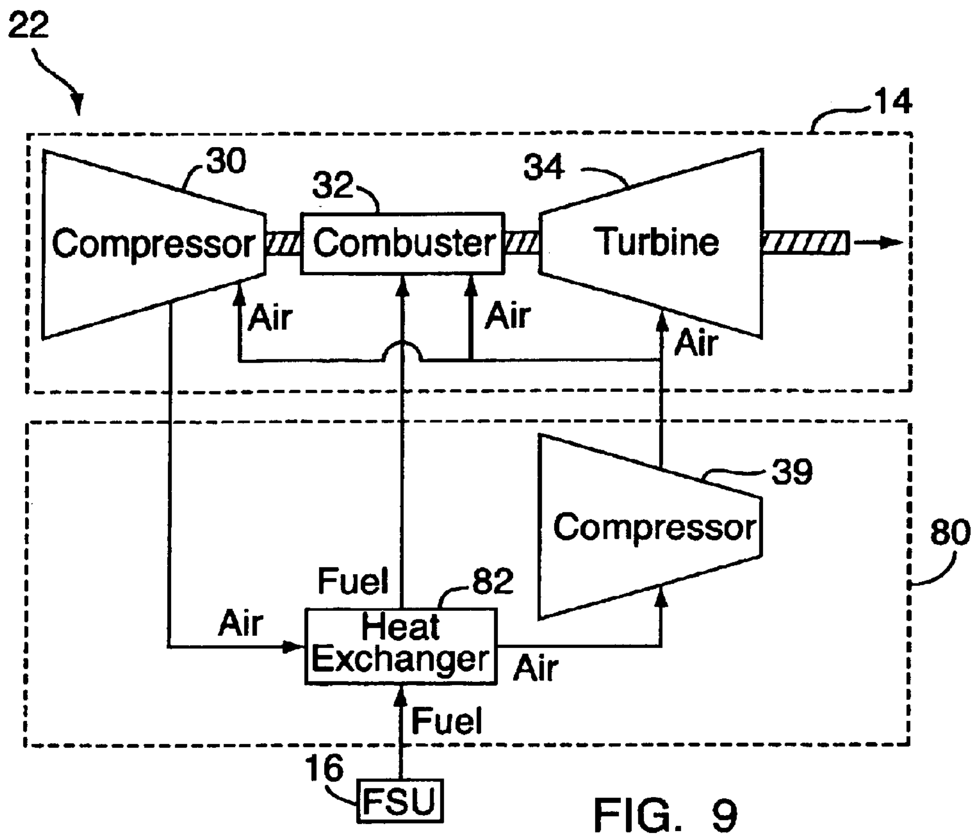
FIG. 9 is a system for the management of heat transfer in which a high temperature heat source is a cooled turbine cooling air unit.

The high temperature heat source 22 may further comprise a cooled turbine cooling air unit 80, as is shown with reference to FIG. 9. The cooled turbine cooling air unit 80, including heat exchanger 82, effects the heat transfer between the deoxygenated fuel from the FSU 16 and the engine 14 by receiving an air stream at a temperature of about 1,200 degrees F. from the compressor 30 of the engine 14 and the deoxygenated fuel stream from the FSU 16. Heat is transferred between the received air stream and the fuel stream, thus heating the deoxygenated fuel and cooling the air. The heated fuel is directed to the combustor 32, and the cooled air is directed to a compressor 39. The outlet stream from the compressor 39 is split into three streams and directed back to the compressor 30, the combustor 32, and the turbine 34. The temperature of the heated fuel is greater than the coking limit of about 325 degrees F. and less than the temperature at which pyrolysis occurs (about 900 degrees F.). In particular, the temperature of the heated fuel is preferably about 700 degrees F. to about 800 degrees F.

Upon directing the cooled air to the turbine 34, a buffer layer of cool air is received at the surfaces of the turbine, thereby allowing the combustion gases received from the combustor 32 to be of higher temperatures.

Figure 10:
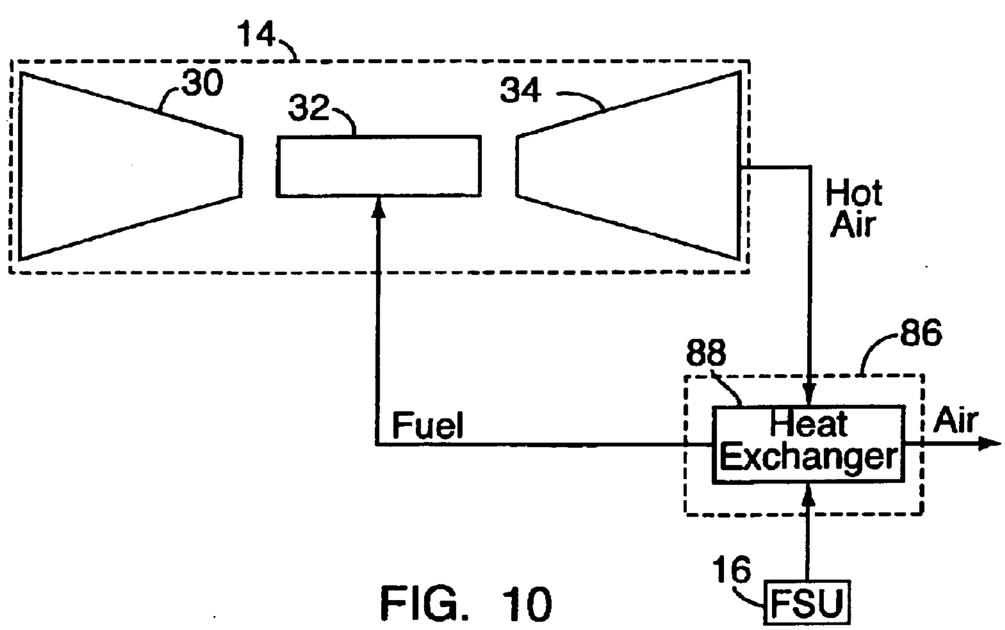
FIG. 10 is a system for the management of heat transfer in which a high temperature heat source is a turbine exhaust recuperator.

The high temperature heat source 22 may comprise a turbine exhaust recuperator 86, as is shown with reference to FIG. 10. The turbine exhaust recuperator 86 provides for the management of heat transfer by utilizing hot gases exhausted from the turbine 34 to heat the fuel directed to the combustor 32. Upon operation of the turbine exhaust recuperator 86, turbine exhaust at about 1,200 degrees F. is directed to a heat exchanger 88 and used to heat the deoxygenated fuel received from the FSU 16. Upon such a heat exchange, cooled exhaust is ejected from the heat exchanger 88. The heated fuel is directed to the combustor 32. The temperature of the fuel directed to the combustor 32 is at least about 550 degrees F., preferably about 550 degrees F. to about 900 degrees F., and more preferably about 700 degrees F. to about 800 degrees F.

Two similar applications to the turbine exhaust recuperator are a fuel-cooled engine case and a fuel-cooled engine exhaust nozzle. Both of these represent high temperature heat sources similar to the turbine exhaust recuperator. In these applications, compact fuel heat exchangers, coils, or jackets are wrapped around either the engine case or the exhaust nozzle to transfer heat from these sources either directly to the fuel or first to an intermediate coolant and then from the intermediate coolant to the fuel. The heated fuel is then directed to the combustor 32.

Figure 11:
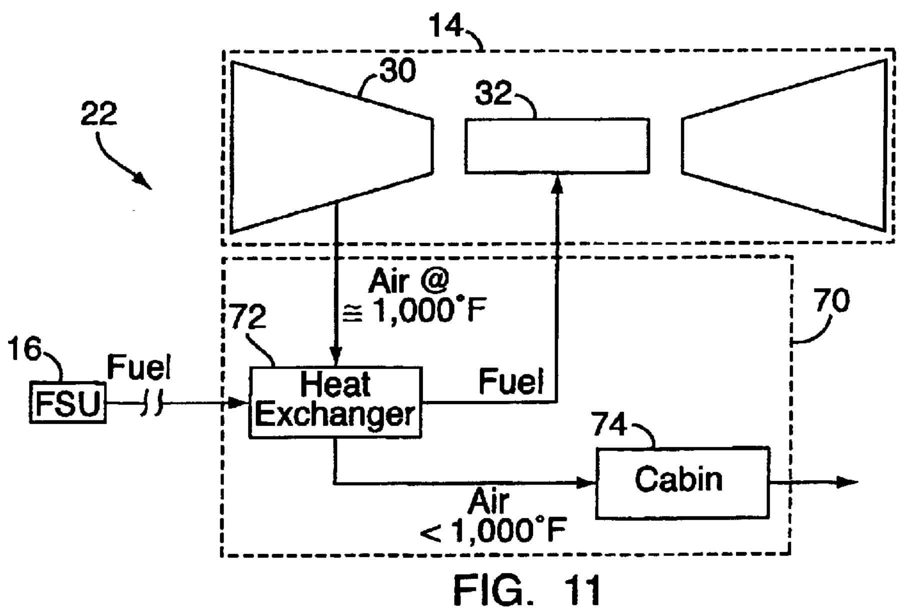
FIG. 11 is a system for the management of heat transfer in which a high temperature heat source is a fuel-cooled environmental control system precooler.

In FIG. 11, the high temperature heat source may be a fuel-cooled precooler 70, which is most often incorporated into an aircraft, and which is hereinafter referred to as "precooler 70." The precooler 70 comprises a heat exchanger 72 that receives an air stream at a temperature of about 1,000 degrees F. from the compressor 30 of the engine 14 and fuel from the FSU 16. Heat is transferred between the incoming air streams and fuel streams to provide an outlet air stream at a temperature of about 450 degrees F. and an outlet fuel stream at a temperature of up to about 900 degrees F. and preferably about 400 degrees F. to about 800 degrees F. The outlet air stream is directed onto the aircraft to provide one or more pneumatic services. The outlet air stream may be utilized to power an environmental control system to provide pressurized cooling air to a cabin 74 of the aircraft. Alternately, or additionally, the air stream may be routed through various airframe structures (e.g., wings and fuselage walls) to provide one or more thermal functions such as de-icing operations and the like. The outlet fuel stream is directed to the combustor 32.

Figure 12:
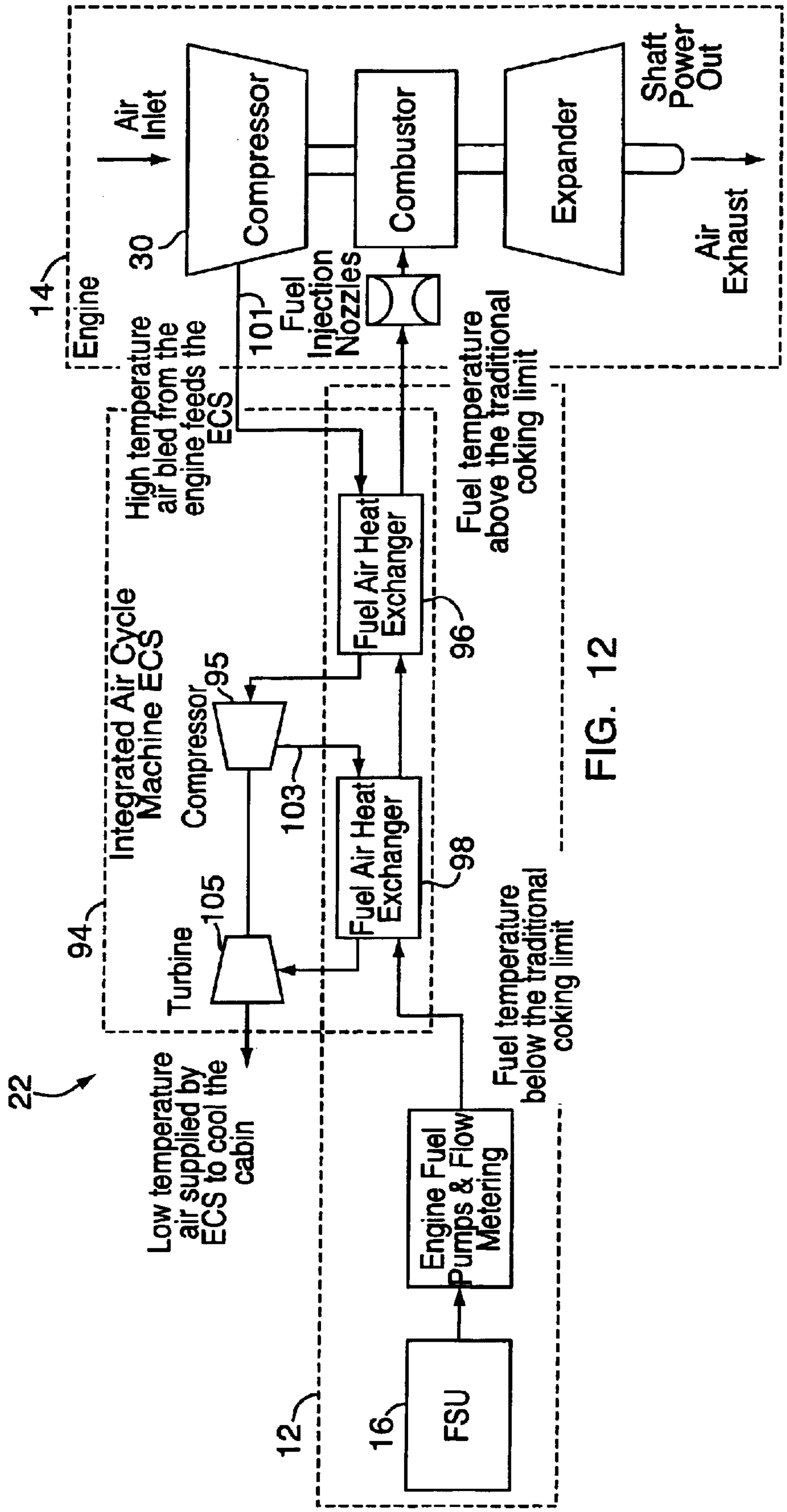
FIG. 12 is a system for the management of heat transfer in which a high temperature heat source is an integrated air cycle environmental control system.

Referring to FIG. 12, the high temperature heat source 22 may comprise an integrated air cycle environmental control system 94 (hereinafter referred to as IACECS 94"). The IACECS 94, which is a variation of the fuel-cooled ECS precooler 70 described above with reference to FIG. 11, functions as a heat sink to the aircraft cabin ECS. The IACECS 94 includes a first fuel/air heat exchanger 96 disposed in serial fluid communication with a second fuel/air heat exchanger 98. The first fuel/air heat exchanger 96 receives a high temperature (about 1,000 degrees F.) air stream 101 bled from the compressor 30 of the engine 14 and the fuel stream from the FSU 16. Upon the exchange of heat, fuel at at least about 325 degrees F., preferably about 550 degrees F. to about 900 degrees F., and more preferably about 700 degrees F. to about 800 degrees F. is directed to the combustor 32. Cooled air ejected from the first fuel/air heat exchanger 96 is directed to a compressor 95 of the IACECS 94. Heat from an air bleed stream 103 from the compressor 95 is then exchanged with the fuel stream from the FSU 16, and heated fuel is directed to the first fuel/air heat exchanger 96 while cooled air is directed to a turbine 105 of the IACECS 94 where it is expanded resulting in low temperature air at the desired cabin pressure. The low temperature air is then received from the turbine 105 and directed to the cabin.

Figure 13:
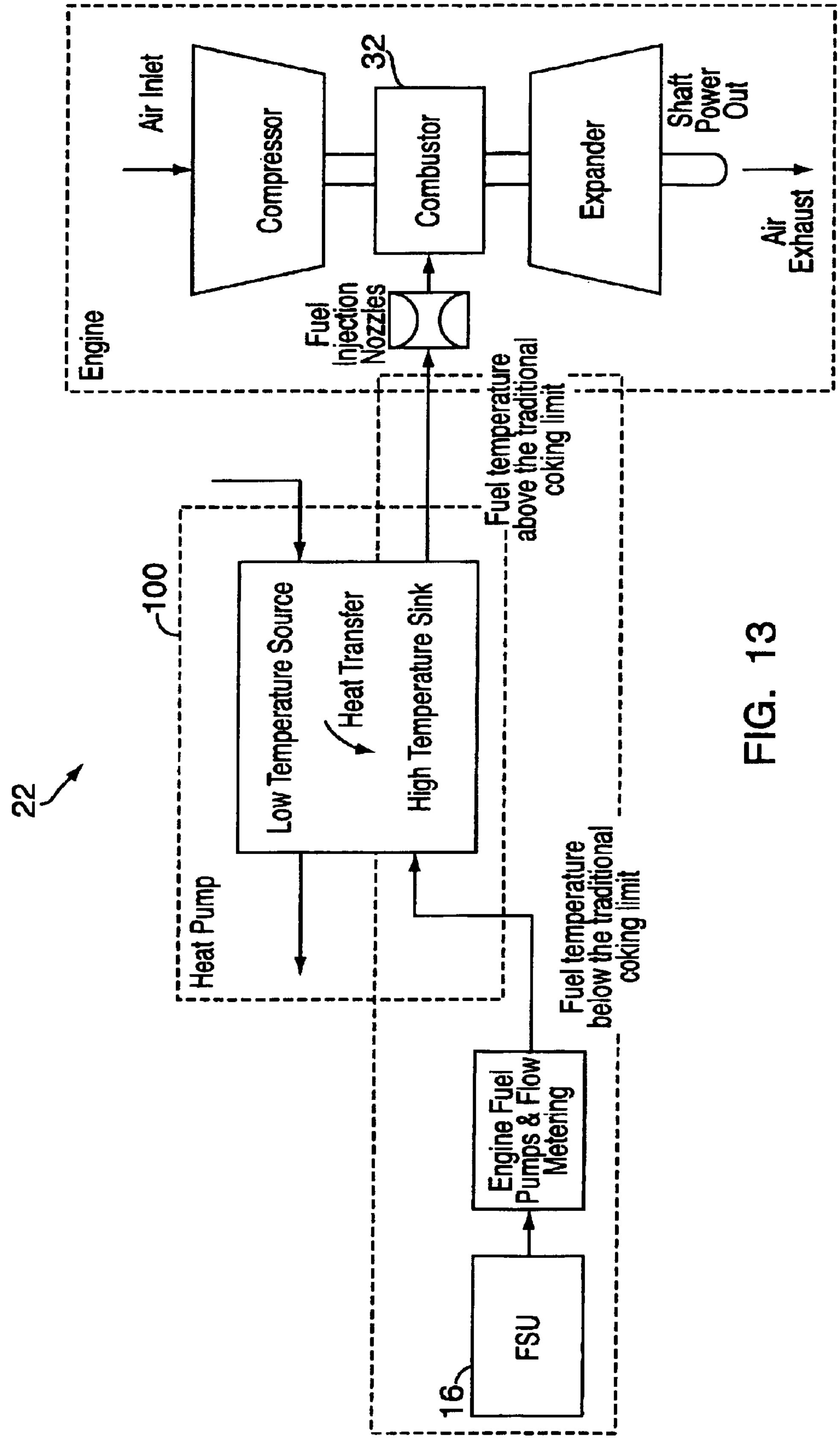
FIG. 13 is a system for the management of heat transfer in which a high temperature heat source is a heat pump.

Referring now to FIG. 13, another high temperature heat source 22 for an aircraft application may comprise a heat pump 100. The heat pump 100 transfers heat from a low temperature source to the deoxygenated fuel that acts as a high temperature heat sink. Because the heat transfer occurs from the low temperature source to the deoxygenated fuel, the heat pump 100 enables the transfer of heat to the deoxygenated fuel from a heat source at a lower temperature to the fuel heat sink at a higher temperature. The fuel discharged from the heat pump 100, which is at a temperature of up to about 900 degrees F., is directed to the combustor 32.

Referring now to all of the Figures, as indicated from the above disclosure, the system 10 provides for the management of heat transfer between the engine 14 and various other associated components of the system 10 via the regulation of various parameters, namely, the oxygen content of the fuel fed to the engine 14 and the temperature of the fuel into the engine 14. Regulation of such parameters results in improved thermodynamic efficiency of the engine.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method of managing thermal transfer in an aircraft, said method comprising:

removing oxygen from a stream of a fuel fed to an engine used to drive said aircraft;

transferring heat from a heat generating sub-system of said aircraft to said fuel; and combusting said fuel.

2. The method of claim 1, wherein said removing oxygen from said stream of said fuel comprises, directing said fuel to a surface of a permeable membrane, applying a vacuum across said permeable membrane to create a partial pressure differential, and causing diffused oxygen dissolved within said fuel to migrate through said permeable membrane.

3. The method of claim 1, wherein said transferring of heat comprises, receiving a compressed air stream from a compressor of said engine into a heat exchanger, and receiving said fuel into said heat exchanger such that heat is transferred from said compressed air stream to said fuel.

4. The method of claim 3, further comprising directing said compressed air stream from said heat exchanger to a cabin of said aircraft.

5. The method of claim 3, further comprising directing said compressed air stream from said heat exchanger to a turbine of said engine.

6. The method of claim 1, wherein said transferring of heat comprises, receiving an air stream from a turbine of said engine into a heat exchanger, and receiving said fuel into said heat exchanger such that heat is transferred from said air stream from said turbine to said fuel.

7. The method of claim 1, wherein said transferring of heat comprises, receiving a high temperature oil stream from a high temperature oil system into a heat exchanger, and receiving said fuel into said heat exchanger such that heat is transferred from said high temperature oil system to said fuel.

8. The method of claim 7, wherein said high temperature oil stream is a bearing and/or gearing arrangement.

9. The method of claim 1, wherein said combusting said fuel comprises, heating said fuel to at least about 550 degrees F., injecting said heated fuel into said engine through a fuel injection nozzle, and igniting said heated fuel.

10. The method of claim 1, wherein said combusting said fuel comprises, heating said fuel to about 550 degrees F. to about 900 degrees F., injecting said heated fuel into said engine through a fuel injection nozzle, and igniting said heated fuel.

11. The method of claim 1, wherein said combusting said fuel comprises, heating said fuel to about 700 degrees F. to about 800 degrees F., injecting said heated fuel into said engine through a fuel injection nozzle, and igniting said heated fuel.

12. The method of claim 1, further comprising pre-heating said stream of fuel prior to said removing oxygen from said stream of fuel.

13. A system for the management of thermal transfer in a gas turbine engine, said system comprising:

a heat generating sub-system disposed in operable communication with said engine;

a fuel source configured to supply a fuel;

a fuel stabilization unit configured to receive said fuel from said fuel source and to provide said fuel to said engine; and a heat exchanger disposed in thermal communication with said fuel to effect the transfer of heat from said heat generating sub-system to said fuel.

14. The system of claim 13, wherein said fuel stabilization unit is upstream of said heat generating sub-system.

15. The system of claim 13, wherein said fuel stabilization unit is downstream of said heat generating sub-system.

16. The system of claim 13, further comprising a pre-heater to heat said fuel before said fuel is received into said fuel stabilization unit.

17. The system of claim 13, wherein said fuel supplied to said engine is at a temperature of greater than about 325 degrees F.

18. The system of claim 13, wherein said fuel supplied to said engine is at a temperature of about 550 degrees F. to about 900 degrees F.

19. The system of claim 13, wherein said fuel supplied to said engine is at a temperature of about 700 degrees F. to about 800 degrees F.

20. The system of claim 13, wherein said fuel stabilization unit comprises, a flow plate having channels disposed in a planar structure thereof, said channels being configured to accommodate a flow of said fuel, and a membrane disposed in interfacial engagement with said flow plate, said membrane configured to receive a flow of oxygen drawn from said fuel therethrough.

21. The system of claim 13, wherein said heat generating sub-system is selected from the group of heat generating sub-systems consisting of a high temperature oil system, a cooled turbine cooling air unit, a turbine exhaust recuperator, a fuel-cooled exhaust nozzle, a fuel-cooled engine case, and combinations of the foregoing heat generating sub-systems.

22. The system of claim 21, wherein said high temperature oil system comprises a heat exchanger configured to receive an oil stream from a bearing and/or gearing arrangement and said fuel from said fuel stabilization unit, said heat exchanger being configured to effect the transfer of heat from said oil stream to said fuel.

23. The system of claim 21, wherein said cooled turbine cooling air unit comprises a heat exchanger configured to receive an air stream from said gas turbine engine and said fuel from said fuel stabilization unit, said heat exchanger being configured to effect the transfer of heat from said air stream to said fuel.

24. The system of claim 21, wherein said turbine exhaust recuperator comprises heat exchanger configured to receive an air stream exhausted from a turbine of said gas turbine engine and said fuel from said fuel stabilization unit, said heat exchanger being configured to effect the transfer of heat from said air stream exhausted from said turbine to said fuel.

25. The system of claim 13, further comprising a selectively-actuatable fuel bypass disposed around said heat generating sub-system, said selectively-actuatable fuel bypass being configured to effect the bypass of fuel around said heat generating sub-system.

26. The system of claim 13, wherein said gas turbine engine is incorporated into an aircraft.

27. A system for the management of heat transfer, said system comprising:

an energy conversion device; and a fuel system configured to supply a fuel to said energy conversion device, said fuel being substantially coke-free, said fuel system comprising at least one heat generating sub-system disposed in thermal communication with said fuel from said fuel system to effect the transfer of heat from said heat generating sub-system to said fuel;

wherein said fuel is heated to a temperature of greater than about 550 degrees F.

28. The system of claim 22, wherein said fuel is heated to a temperature of about 550 degrees F. to about 900 degrees F.

29. The system of claim 27, wherein said fuel is heated to a temperature of about 700 degrees F. to about 800 degrees F.

30. The system of claim 27, wherein said energy conversion device is a gas turbine engine.

31. The system of claim 27, wherein said fuel system further comprises a fuel stabilization unit to deoxygenate said fuel.

32. The system of claim 31, wherein said fuel stabilization unit comprises, a flow plate having channels disposed in a planar structure thereof, said channels being configured to accommodate a flow of said fuel, and a membrane disposed in interfacial engagement with said flow plate, said membrane being configured to receive a flow of oxygen drawn from said fuel therethrough.

33. The system of claim 32, further comprising baffles disposed in said channels to facilitate the mixing of fuel in said flow plate.

34. The system of claim 33, wherein said mixing of fuel is effected in a turbulent flow regime.

35. The system of claim 33, wherein said mixing of fuel is effected in a laminar flow regime.

36. The system of claim 32, wherein said membrane comprises a fluoropolymer coating disposed on a porous backing.

37. The system of claim 32, further comprising a porous substrate disposed in interfacial engagement with said membrane.

38. The system of claim 27, wherein said at least one heat generating sub-system is selected from the group of heat generating sub-systems consisting of a fuel-cooled environmental control system precooler, a cooled turbine cooling air unit, a turbine exhaust recuperator, a heat pump, a fuel-cooled exhaust nozzle, a fuel-cooled engine case, and combinations of the foregoing heat generating sub-systems.

39. The system of claim 27, wherein said fuel system further comprises a vessel in which said fuel is stored, said stored fuel being configured to receive heat from said at least one heat generating sub-system.

40. The system of claim 27, wherein said thermal communication between said at least one heat generating sub-system and said fuel is effected using a heat exchanger.

41. The system of claim 27, further comprising a selectively-actuatable fuel bypass disposed around said heat generating sub-system, said selectively-actuatable fuel bypass being configured to effect the bypass of fuel around said heat generating sub-system.

42. A system for the thermal management of an aircraft, said system comprising:

means for powering said aircraft;

means for supplying a fuel to said means for powering said aircraft;

means for deoxygenating said fuel; and means for effecting the transfer of heat between a heat generating sub-system of said aircraft and said fuel.

43. The system of claim 42, wherein said means for effecting the transfer of heat comprises a heat exchanger.

44. The system of claim 42, wherein said heat generating sub-system is selected from the group of heat generating sub-systems consisting of a fuel-cooled environmental control system precooler, a high temperature oil system, a cooled turbine cooling air unit, a turbine exhaust recuperator, a heat pump, and combinations of the foregoing heat generating sub-systems.

45. The system of claim 42, wherein said heat generating sub-system comprises a fuel-cooled engine case.

46. The system of claim 45, wherein said fuel-cooled engine case comprises a device disposed in communication with said engine case to transfer heat to said fuel, said device being selected from the group of devices consisting of fuel heat exchangers, coils, and jackets.

47. The system of claim 42, wherein said heat generating sub-system comprises a fuel-cooled engine exhaust nozzle.

48. The system of claim 41, wherein said fuel-cooled exhaust nozzle comprises a device disposed in communication with said exhaust nozzle to transfer heat to said fuel, said device being selected from the group of devices consisting of fuel heat exchangers, coils, and jackets.

49. A system for the management of thermal transfer in an aircraft, said system comprising:

an aircraft engine;

a heat generating sub-system disposed in operable communication with said aircraft engine;

a fuel source configured to supply a fuel;

a fuel stabilization unit configured to receive said fuel from said fuel source and to provide an effluent fuel stream to said aircraft engine; and a heat exchanger disposed in thermal communication with said effluent fuel stream from said fuel stabilization unit and said heat generating sub-system to effect the transfer of heat from said heat generating sub-system to said effluent fuel stream.

50. The system of claim 49, wherein said heat generating sub-system is selected from the group of heat generating sub-systems consisting of a fuel-cooled environmental control system precooler, a high temperature oil system, a cooled turbine cooling air unit, an integrated air cycle environmental control system, a turbine exhaust recuperator, a heat pump, and combinations of the foregoing heat generating sub-systems.

51. The system of claim 50, wherein said fuel-cooled environmental control system precooler comprises a heat exchanger configured to receive an air stream from said aircraft engine and said fuel from said fuel stabilization unit, said heat exchanger being configured to effect the transfer of heat from said air stream to said fuel.

52. The system of claim 50, wherein said heat pump is configured to transfer heat from a low temperature source to said fuel from said fuel stabilization unit.

53. The system of claim 49, further comprising a preheater configured to heat said fuel supplied to said fuel stabilization unit.

54. The system of claim 49, wherein said heat generating sub-system comprises a fuel-cooled engine case.

55. The system of claim 54, wherein said fuel-cooled engine case comprises a device disposed in communication with said engine case to transfer heat to said fuel, said device being selected from the group of devices consisting of fuel heat exchangers, coils, and jackets.

56. The system of claim 49, wherein said heat generating sub-system comprises a fuel-cooled engine exhaust nozzle.

57. The system of claim 56, wherein said fuel-cooled exhaust nozzle comprises a device disposed in communication with said exhaust nozzle to transfer heat to said fuel, said device being selected from the group of devices consisting of fuel heat exchangers, coils, and jackets.

* * * * *

UNITED STATES PATENT AND TRADEMARK OFFICE

CERTIFICATE OF CORRECTION

PATENT NO. : 6,939,392 B2 
DATED : September 6, 2005
INVENTOR(S) : Louis J. Spadaccini et al.

It is certified that error appears in the above-identified patent and that said Letters Patent is hereby corrected as shown below:

<u>Title page,</u>
Item [75], Inventors, should read as follows:
-- Louis J. Spadaccini
Scott F. Kaslusky
Thomas G. Tillman
Timothy D. DeValve
Luca Bertuccioli
Michael K. Sahm
He Huang
Robert L. Bayt
Foster Philip Lamm
Danile R. Sabatino --.

Signed and Sealed this

First Day of November, 2005

JON W. DUDAS
*Director of the United States Patent and Trademark Office*